(12) United States Patent
Herschbach

(10) Patent No.: US 9,720,090 B2
(45) Date of Patent: Aug. 1, 2017

(54) DRIVER ASSISTANCE SYSTEM COMPRISING AN OPTICAL DETECTOR WITH ACTIVE SCENE ILLUMINATION

(71) Applicant: IEE INTERNATIONAL ELECTRONICS & ENGINEERING S.A., Echternach (LU)

(72) Inventor: Norbert Herschbach, Medernach (LU)

(73) Assignee: IEE International Electronics & Engineering S.A., Echternach (LU)

( * ) Notice: Subject to any disclaimer, the term of this patent is extended or adjusted under 35 U.S.C. 154(b) by 253 days.

(21) Appl. No.: 14/415,731

(22) PCT Filed: Jul. 16, 2013

(86) PCT No.: PCT/EP2013/064958
§ 371 (c)(1),
(2) Date: Jan. 19, 2015

(87) PCT Pub. No.: WO2014/012909
PCT Pub. Date: Jan. 23, 2014

(65) Prior Publication Data
US 2015/0168555 A1 Jun. 18, 2015

(30) Foreign Application Priority Data
Jul. 17, 2012 (LU) ........................ 92 044

(51) Int. Cl.
*G01C 3/08* (2006.01)
*G01S 17/89* (2006.01)
(Continued)

(52) U.S. Cl.
CPC ............ *G01S 17/89* (2013.01); *G01S 7/4818* (2013.01); *G01S 17/48* (2013.01); *G01S 17/936* (2013.01)

(58) Field of Classification Search
CPC ........ G01S 17/48; G01S 17/89; G01S 17/936; G01S 7/4818
(Continued)

(56) References Cited

U.S. PATENT DOCUMENTS

2005/0269481 A1* 12/2005 David .................... G01S 7/484
250/208.1
2008/0180965 A1* 7/2008 Nakamura ........... B60Q 1/0023
362/507
(Continued)

FOREIGN PATENT DOCUMENTS

| DE | 10146808 A1 | 4/2003 |
|---|---|---|
| EP | 0566027 A1 | 10/1993 |
| FR | 2691117 A1 | 11/1993 |

OTHER PUBLICATIONS

International Search Report issued Oct. 24, 2013 re: Application No. PCT/EP2013/064958; citing: EP 0 566 027 A1, DE 101 46 808 A1, US 2012/154785 A1, FR 2 691 117 A1 and US 2010/296077 A1.
(Continued)

*Primary Examiner* — Mark Hellner
(74) *Attorney, Agent, or Firm* — Reising Ethington P.C.

(57) ABSTRACT

A driver assistance system (12) comprises an optical detector (14) with active scene illumination. The optical detector includes at least one of a stereoscopic imager, a time-of-flight imager, a structured-light imager and a night vision system. The optical detector includes a light source (16) for converting electrical energy into light, projection optics (18) for illuminating a scene with light generated by the light source and one or more optical sensors (20) for detecting light returned from the scene in response to the scene being illuminated. The light source is thermally connected to a heat sink (30) for evacuating heat produced by the light source and the projection optics are optically connected to the light source with one or more optical fibers (22) for
(Continued)

transport of light generated by the light source to the projection optics.

16 Claims, 2 Drawing Sheets

(51) Int. Cl.
*G01S 17/48* (2006.01)
*G01S 17/93* (2006.01)
*G01S 7/481* (2006.01)

(58) Field of Classification Search
USPC .......................................... 356/4.01
See application file for complete search history.

(56) References Cited

U.S. PATENT DOCUMENTS

2010/0296077 A1  11/2010  Scott et al.
2012/0154785 A1   6/2012  Gilliland et al.

OTHER PUBLICATIONS

Written Opinion issued Oct. 24, 2014 re: PCT/EP2013/064958; pp. 5; citing: EP 0 566 027 A1, DE 101 46 808 A1, US 2012/154785 A1, FR 2 691 117 A1 and US 2010/296077 A1.

\* cited by examiner

DRIVER ASSISTANCE SYSTEM COMPRISING AN OPTICAL DETECTOR WITH ACTIVE SCENE ILLUMINATION

TECHNICAL FIELD

The present invention generally relates to a driver assistance system comprising an optical detector with active scene illumination.

BACKGROUND ART

In Advanced Driver Assistance Systems (ADAS), active illumination systems, preferably of infrared wavelength, are useful to realize several functions ranging from Night Vision to different methods of three-dimensional optical sensing like time-of-flight techniques using a pulsed or periodically modulated active illumination or different techniques based on the triangulation method, for example structured-light imaging or stereo-vision at night.

In order to achieve large illumination angles, the optical unit projecting the illumination field should be installed either in the headlamp or radiator cowling region, in the front of the car excluding more re-entrant locations, or, alternatively, in the top-middle area of the windshield or the windshield corners.

However, for the mitigation of injuries to pedestrians in car-pedestrian crash events, the front of an automobile should be engineered such that it absorbs the impact energy by relatively soft deformation and receding of the exposed components. That leads to problems as regards the integration of driver assistance systems.

BRIEF SUMMARY

According to an aspect of the invention, a driver assistance system comprises an optical detector with active scene illumination. The optical detector includes a light source for converting electrical energy into light, projection optics for illuminating a scene with light generated by the light source and one or more optical sensors for detecting light returned from the scene in response to the scene being illuminated. The light source is thermally connected to a heat sink for evacuating heat produced by the light source and the projection optics are optically connected to the light source with one or more optical fibers for transport of light generated by the light source to the projection optics. The optical detector is selected among a stereoscopic imager, a time-of-flight imager, a structured-light imager, a night vision system or any combination of these.

As those skilled will appreciate, the provision of one or several optical fibers between the light source and the projection optics alleviates the design constraints upon the system. Indeed, when built into the car front, a complete illumination unit including light source, driver electronics and heat sink would become too large in size, in mass and hardness of the construction to be compliant with a design of the front of the car which minimizes the hazards for serious injuries of pedestrian in car accidents involving pedestrians.

Positioning the complete illumination unit in the top-middle part or the upper corner areas of the windshield is even more problematic. First, because the available space to integrate the illumination unit is very limited since this space is typically already reserved for one or more cameras and other sensors. Second, because heat sinking in the car interior under the car roof is very difficult if not close to impossible regarding the amount of several tens of watts of expected waste heat generated by the light source and its driver electronics.

To remove the waste heat using conventional extruded heat sinks, a heat sink requires a considerable volume at the waste power level that has to be dissipated. The heat sink requirements determine the minimum size and weight of the illumination unit and are causing severe problems of placing the illumination unit as a monolithic unit. In addition, the efficiency of electrical-to-optical power conversion of typical high power semiconductor light sources, LEDs or diode lasers, is substantially decreased when the operation temperature is elevated. Also the lifetime of these devices is shortened by an operation at elevated temperature over extended periods of time.

It will be appreciated that the present invention allows optimizing the thermal management such that large component temperatures can be avoided, which in turn would require even larger heat sinks.

Another problem area to be considered with modern active illumination systems is electromagnetic compatibility. Depending on the functions it has to fulfill, the emission of light is amplitude-modulated in the high frequency (HF) range or pulsed with very short rise and fall times and varying repetition rates up to frequencies in the HF range. As light sources, such as e.g. high power light-emitting-diodes (LEDs) or high power diode lasers of different kinds, require large currents on the order of 1 A up to several 10 A, the current drive circuit including the light generating device is also a source of strong electromagnetic fields and electromagnetic disturbances which can be transferred to other components of the car by capacitive or inductive coupling or by electromagnetic radiation. In illumination modules, therefore, additional components like RF chokes and HF shielding sheets have to be incorporated, which increases the problems with size and weight restriction requirements for the unit. As will be appreciated, this problem is also reduced thanks to the present invention, since the light source, including any shielding devices may be arranged remote from the projection optics in the front part of the car, where integration is of particular difficulty for the reasons mentioned above.

Thus, in the context of the present invention, instead of integrating into a single unit the light source, the driver electronics for the light source and the optics to project a dedicated light field distribution onto the scene in front of the car, an illumination system is proposed, in which the projection optics is separated from a unit containing the light source and its driver electronics. The light is transported from the light source unit to the projection optics using optical fiber technology. Independent of the location of the projection optics the light source unit can then be placed at many possible locations within the vehicle, which might impose less restrictions regarding available space and might be more favourable for efficient thermal management than the location of the projection optics unit. The separate projection optics unit can be of a small and lightweight construction, which it is easier to find space for at different locations in the windscreen border regions, or in the front of the car, the headlamp regions or radiator cowling region. It is also conceivable to split the projection optics into several units distributed over different locations in the car. The unit comprising the light source and its driver electronics may also host the computing unit processing the large data stream from the imaging sensors, which reduces the number of separate units forming the system and the data lines connecting them, and may also alleviate thermal management problems.

According to preferred embodiments of the invention, the light source comprises at least one of a fiber-coupled semiconductor laser, a fiber-laser, an array of fiber-coupled semi-conductor lasers, a fiber-coupled LED and an array of fiber-coupled LEDs.

The heat sink may comprise a metal body with fins, a radiator, a cooling fan, a liquid-cooled heat sink, a heat pipe and/or a thermoelectric cooler.

Preferably, the driver assistance system comprises a processor operatively connected to the one or more optical sensors for deriving information to be conveyed to the car driver and/or for determining actions to be taken by the driver assistance system.

The one or more optical sensors used by the optical detector are preferably arranged as an imaging sensor unit, e.g. a time-of-flight (TOF) 3D imager (camera and/or scanner), a 2D camera (for night vision, structured light sensing) and/or a plurality of 2D cameras (for stereoscopic imaging).

The optical detector is, preferably, part of a computer vision system.

The light source may be configured to emit pulsed light and/or intensity-modulated light. This is especially useful if the optical detector operates according to the TOF principle for deriving 3D information relating to the scene. In other applications, e.g. if the optical detector uses structured light for deriving 3D information relating to the scene, the light source may emit other forms of light, such as e.g. continuous-wave (CW) light.

Preferably, the light source is an infrared light source.

A further aspect of the invention relates to an automotive vehicle, comprising a driver assistance system as presented hereinabove, wherein the light source is arranged remote from the projection optics. In such an automotive vehicle, the projection optics are preferably arranged at a windscreen border and or in the front of the vehicle, e.g. at or in the headlamps or in the radiator cowling region.

BRIEF DESCRIPTION OF THE DRAWINGS

Further details and advantages of the present invention will be apparent from the following detailed description of not limiting embodiments with reference to the attached drawings, wherein.

DESCRIPTION OF PREFERRED EMBODIMENTS

Most modern ADAS employ optical detection systems, which require an active illumination in the infrared wavelength range. The data of several detection systems, three-dimensional and/or two-dimensional, is evaluated to obtain a greater accuracy and reliability required for safety functions like automatic emergency braking. Three-dimensional imagers, which use the time-of-flight method require an active illumination which is amplitude-modulated or pulsed in the HF frequency range. For these systems, it is typical that the illumination module is built in a single unit, which comprises the light source, its driver and a dedicated optical system to transform the output of the light source device into the light field distribution required in the scene. Similarly, sensor systems using the structured-light imaging method employ illumination units, which include light source, driver electronics and projection optics.

Since the electrical-to-optical power conversion efficiency of the light source and its driver is limited and typically lies in a range from 20% to 50%, the illumination unit produces a large amount of waste heat power, which requires an efficient heat management. Conventional convection air-cooled heat sinks with fins are usually used, since more involved methods like water-cooling are often considered too complicated and expensive. The large optical power levels necessary for an accurate and reliable operation of the sensor hence require also large heat sinks. The resulting large size and mass as well as the stiffness of the construction of the unit lead to the problems of the prevention of hazards of injuries of pedestrians in car-pedestrian accident events, general difficulties of integration into the design of the car, and difficulties with heat management and component lifetime.

In order to minimize the consumption of electrical energy by the illumination unit and the production of waste heat, while ensuring that sufficient light is produced and projected into the scene for an efficient functioning of the sensor, the illumination's intensity distribution over the scene in front of the car has to be optimized. A further constraint that has to be taken into account in the optimization problem of the required light field distribution and projection optics is that the design of the illumination system has to be compliant with eye safety regulation concerning near-infrared and short-wavelength infrared light sources.

Also the number of different units and the data connection lines between them can become problematic with modern three-dimensional sensor systems for ADAS. Next to cameras and illumination devices also at least one computing unit is typically required to process the sensor data. The large rate at which sensor data typically have to be processed also means that the computing unit will have to dissipate a considerable heat power and thus have heat sinks of a considerable size.

Figure 1:
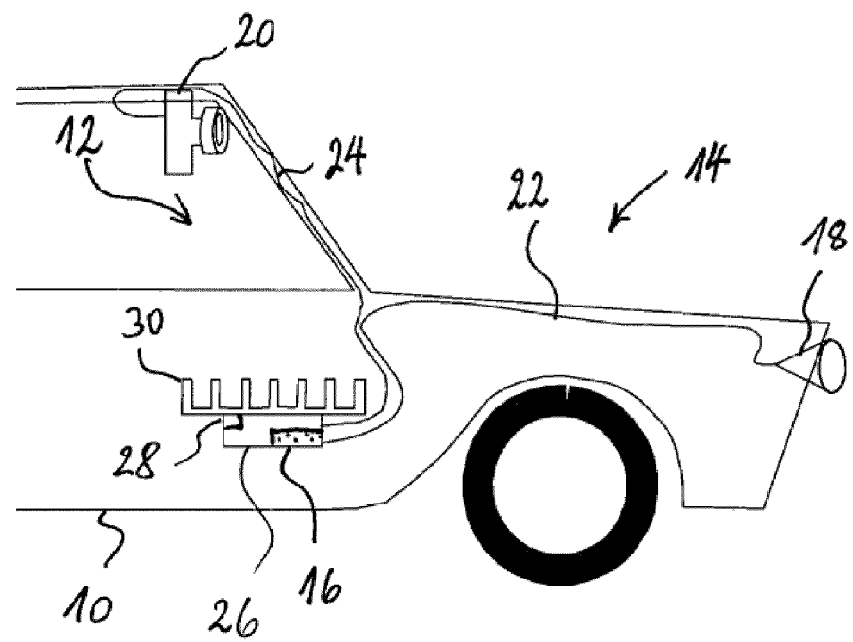
FIG. 1 is a schematic illustration of a car equipped with an advanced driver assistance system according to a preferred embodiment of the invention.

According to this invention, the arrangement of light source and projection optics within a single unit is avoided by a design relying on optical fiber technology which allows a complete reorganisation of the sensor system and its components. FIG. 1 gives a schematic view of a reorganised sensor system according to a preferred embodiment of this invention. The car 10 comprises an advanced driver assistance system (ADAS) 12, e.g. implementing one or more of adaptive cruise control (ACC), lane departure warning, lane change assistance, collision avoidance, intelligent speed adaptation, night vision, adaptive light control, traffic sign recognition, blind spot detection, etc. The ADAS 12 comprises an optical detector 14 with active scene illumination. The optical detector 14 includes an infrared light source 16, projection optics 18, for projecting the infrared light produced by the light source into the scene in front of the car 10 and an optical sensor unit 20, e.g. a time-of-flight (TOF) 3D imager (camera and/or scanner) and/or at least one 2D camera. The light source 16 is coupled to an optical fiber 22, which transports the light to the separate projection optics, which, in the illustrated example, is arranged in the front of the car 10. It is worthwhile noting that the optical detector 14 may comprise several units of projection optics 18. The light source 20 could be a fiber-coupled semiconductor laser module, a fiber-laser or a fiber-coupled light source of LED type. The light source 16 is part of an integrated control unit 26 also including a processor 28 configured for the processing of the data collected by the optical sensor unit 20. A heat sink 30 is connected in heat-conducting manner with the integrated control unit 26.

A data cable connection 24 between the optical sensor unit 20 and the integrated control unit 26 is provided for synchronization of the illumination pulses or intensity modulation with the detection and/or demodulation system, which is of particular importance for systems using the time-of-flight method. The data cable connection 24 can be of different types including electronic signalling, low-voltage differential signalling (LVDS) lines, for example, or optical signalling lines using optical fibers. In case of electronic signaling, the cable connection 24 must be well shielded against electromagnetic disturbances and phase changing parasitic capacitances must be avoided. The detection system of three-dimensional sensors based on the time-of-flight method typically comprises of a special time-of-flight camera with an imaging sensor measuring the phase shift in the modulation of the detected signal in each pixel with respect to the illumination or the time lag between the detection event and the illumination pulse. In addition to the time-of-flight camera, conventional cameras may be used for two-dimensional imaging.

The fiber-coupling of the light source 16 to the projection optics 18 yields the freedom of placing the light source 16 and the driver electronics required for its operation in many possible locations within the vehicle 10. This is very advantageous to find solutions to the problems described hereinabove. Mainly thermal management problems of the light source 16 and the necessary driver electronics can be addressed more efficiently by the possibility to use heat sinks 30 with larger heat dissipation capacity as restrictions on size and geometry become less severe, or by the choice of a location within the vehicle 10, which is more favourable to heat sinking or where the ambient temperature is varying over a smaller range than in the radiator cowling region for example. Even a connection to existing cooling systems, for example to the air-conditioning system, is conceivable. It may be particularly advantageous to combine the light source 16 and its driver with the processing unit 28, which is typically required to process the large imager data streams. In this combination the thermal management of light source 16, its driver and processing hardware can be organized in a more centralized way, and the number of different modules which form the system as well as the number of cable connections between them is reduced, simplifying the construction of the system. In the schematic view of a possible embodiment of the invention in FIG. 1 only one data cable connection 24 is required between the optical sensor unit 20 and the integrated control unit 26 hosting the light source 16, its driver electronics, and the computing hardware.

Of particular importance for the time-of-flight method is the phase shift or time lag optical signals incur when travelling from light source to the projection optics. This quantity is precisely defined by the length of the optical fiber 22, which is easily controllable in the production process. An additional second optical fiber (optional—not shown in FIG. 1) within the optical fiber jacket may be used to signal back to the integrated control unit the light emission levels from the projection optics 18 for intensity control purposes or for verification of the functioning of the illumination.

Figure 2:
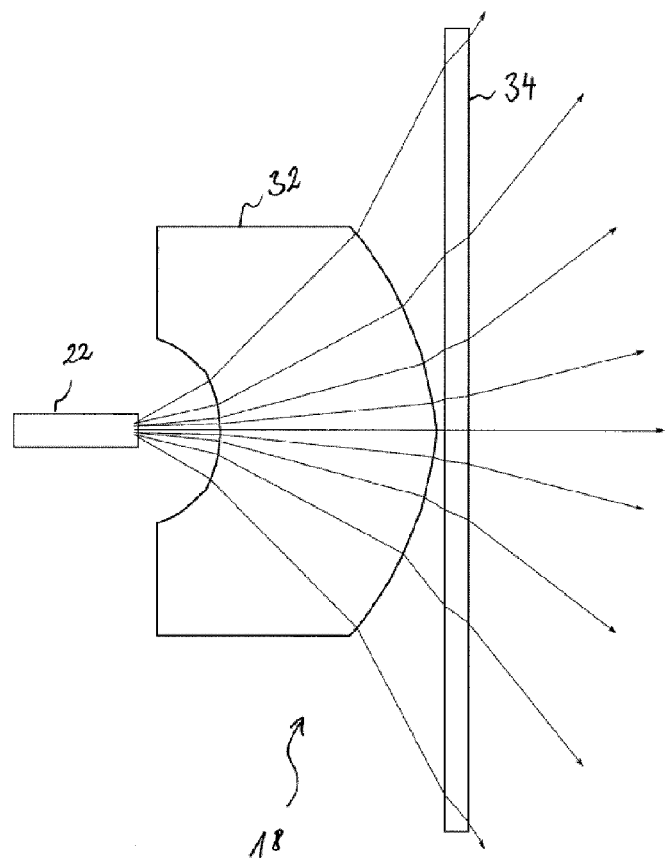
FIG. 2 is a schematic cross sectional view of projecting optics.

A possible embodiment of the projection optics 18 for systems using the time-of-flight method is schematically shown in FIG. 2. The design of the projection optics 18 has to take into account several aspects. One of these aspects is eye safety, and depending on the type of light source 16 used, either laser safety regulation or the equivalent regulation for lamps and lamp systems apply. For a compliance with laser safety class 1 or 1M, for example, it is important that the so-called apparent source size is enlarged by an appropriate design of the projection optics to reduce the restrictions on permissible light power.

In the embodiment sketched in FIG. 2, the light beam from the optical fiber output coupling is therefore expanded to give a spot size on the order of cm using the lens surfaces of the expansion optics 32. The precise optical design of the expansion optics 32 is adapted to the beam properties of the fiber output and depends on the beam shape and radii required behind the expansion optics 32. Behind the expansion optics the light beam is projected onto a diffuser element 34, which can be an optical diffuser or a micro-lens array or an array of lenses of different types or a combination of lens array and optical diffuser. The purpose of this element is twofold. First, it has to prevent a direct view on the optical fiber output end in front of the expansion optics 32, such that the apparent light source when viewed by a human is the large spot projected onto the diffuser element. This is important in order to achieve the compliance with eye safety regulation and helps to reduce the remaining visibility of the illumination when shorter wavelengths in the near-infrared are used. The second purpose of the diffuser element 34 is to generate together with the expansion optics 32 the illumination intensity distribution as it is required in the scene. Different types of optical diffusers 34 can be used to fulfil the first or both purposes. Main types are conventional ground glass diffusers, holographic diffusers, or engineered diffusers with diverse possibilities of microscopic surface structuring including micro-lenses, which allow the designer to shape the resulting light field distribution. It is also possible to place the optical diffuser structure on one side of the diffuser element and use the other side for a lens array with different lenses to achieve a better shaping of the intensity distribution for the illumination.

An intensity distribution that optimises the performance of the optical detection system can be realized for a given field of view of the sensor and when the required detection range is defined as a function of the angles spanning the field-of view. The illumination intensity distribution can be adapted to compensate the inverse square dependence of the detected return light signal on the distance from scene object to the detector.

The projection optics 18 can be made entirely from plastic and optical plastic materials like optical grade polycarbonate and can be manufactured using injection molding techniques. Thus the projection optics 18 can be a low-cost and very lightweight component, which are generally appealing aspects in car manufacturing. It will also be appreciated that such projection optics 18, when built into the front of the car 10, would not constitute a source of additional hazard of injury in pedestrian-car accidents. The small size, lightweight and low-cost construction of the illumination projection optics and the absence of the need for heat sinking enables not only a placement in many different locations within the vehicle, also the splitting of the illumination using several projection units distributed over different favourable positions in the vehicle becomes feasible.

Figure 3:
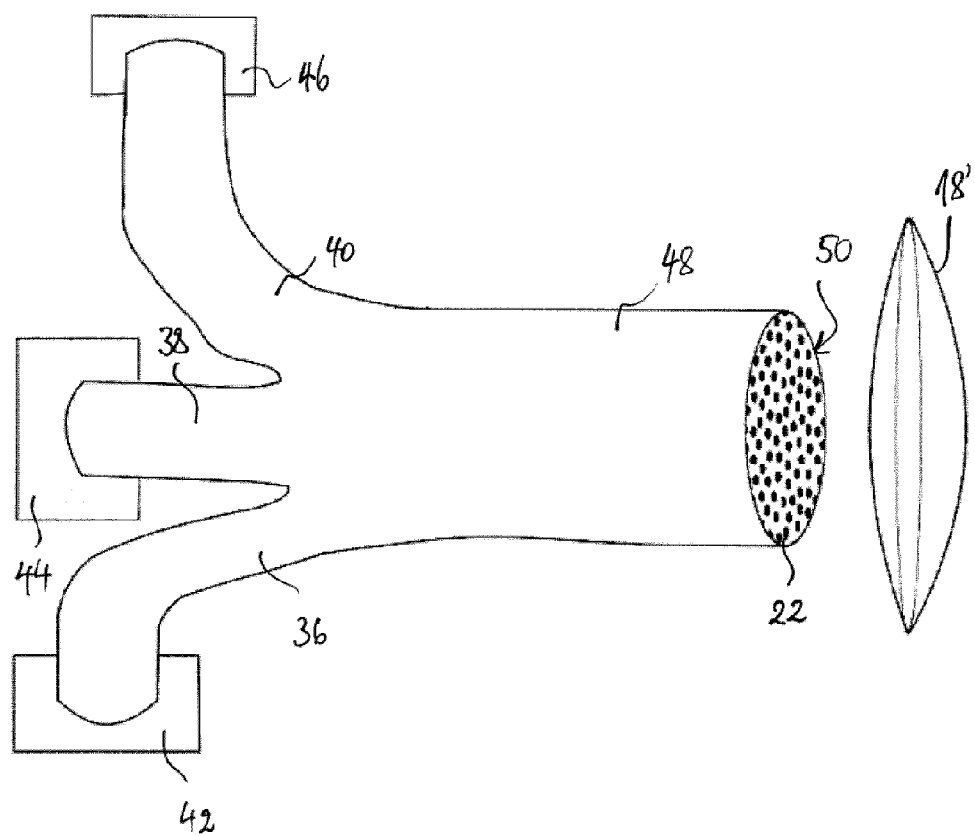
FIG. 3 is a schematic illustration of an illumination unit (light sources, optical fibers and projecting optics) for projecting structured light into a scene.

Also for sensor systems based on the structured-light imaging method illumination systems can be realized using optical fiber technology. A realization using bundles of optical fibers is proposed. FIG. 3 schematically shows a possible embodiment of an illumination device, which produces a structured light field for this type of three-dimensional sensor. Each of several smaller bundles of optical fibers 36, 38, 40 is connected to a separate fiber-coupled array of light sources 42, 44, 46, which can be an array of lasers, such as a semiconductor laser array or a fiber laser array or a light-emitting diode array. Although only three fiber-coupled array light sources are shown in FIG. 3, as many as necessary can be used. The smaller fiber bundles 36, 38, 40 are merged to one larger fiber bundle 48. The merger can be arranged such that the individual optical fibers 22 from the different smaller bundles 36, 38, 40 are either randomly arranged over the cross section of the resulting large fiber bundle 48 or are arranged in particular patterns. The output end face 50 of the large bundle 48 can be optically polished and coupled to a projection optics 18' of different design than that shown in FIG. 2, which has to be fit to image the pattern formed by the arrangement of individual fibers 22 in the bundle cross section onto the scene. By switching-on a single light source at a time or combinations of them, different illumination patterns can be produced for structured-light imaging, which can increase accuracy and reliability of the measurement. By switching on all light sources at the same time, the illumination system can be used in addition to produce a homogeneous illumination distribution as needed for functions like Night Vision.

The fiber-coupled projection unit can be made entirely of injection molding plastic components, thus giving a very lightweight module, which does not constitute a source of additional hazard of injury in pedestrian-car accidents when built into the front of the car. Due to the smaller size and weight of the fiber-coupled projection unit and because it requires no heat sinking, a much larger freedom to place the illumination projector unit within the car is given. Placements in the windscreen areas, in the upper middle region or in the corners as well as in the front of the car, in radiator cowling area, the headlamp or fog light areas become feasible. The dramatically increased placement freedom and the technological ease of splitting the light source output into several optical fibers also open up the possibility to use several illumination projection units in different locations within the vehicle. Thus distributed illumination units could increase accuracy and reliability of the sensor functions and help to avoid problems with dead angles and shadow regions.

Heat-sinking requirements of the light sources and the driver electronics can be more easily met because the size and mass restrictions are less severe when the fiber-coupled light source and driver unit can be placed in different locations within the vehicle, which could in addition be more favourable to thermal management.

The fiber-optic coupling of the light source to the projection optics also helps to achieve more easily the electromagnetic compatibility, because the opening required for the optical fiber exit in the light source driver housing is minuscule allowing more complete shielding, and the less severe size and weight reduction requirements allow the employment of additional shielding layers.

By combining the light source and driver electronics with the computing hardware in a single unit the number of different units composing the sensor system and the number of necessary data connection lines between the units is reduced.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A driver assistance system comprising an optical detector with active scene illumination, said optical detector including at least one of a stereoscopic imager, a time-of-flight imager, a structured-light imager and a night vision system, wherein said at least one of a stereoscopic imager, a time-of-flight imager, a structured-light imager and a night vision system comprises:
   a light source for converting electrical energy into light, said light source being thermally connected to a heat sink for evacuating heat produced by said light source; projection optics for illuminating a scene with light generated by said light source, said projection optics being optically connected to said light source with one or more optical fibers for transport of light generated by said light source to said projection optics; and
   one or more optical sensors for detecting light returned from said scene in response to said scene being illuminated; said one or more optical sensors being separate from said projection optics and said one or more optical fibers and arranged independently from said projection optics and said one or more optical fibers.

2. The driver assistance system as claimed in claim 1, comprising a control unit, said control unit being operatively coupled to said one or more optical sensors via a data cable connection.

3. The driver assistance system as claimed in claim 2, wherein said light source is a part of said control unit, and wherein said control unit is operatively coupled said projection optics by means of said one or more optical fibers.

4. The driver assistance system as claimed in claim 1, wherein said light source comprises at least one of a fiber-coupled semiconductor laser, a fiber-laser, an array of fiber-coupled semi-conductor lasers, a fiber-coupled LED and a array of fiber-coupled LEDs.

5. The driver assistance system as claimed in claim 1, wherein said heat sink comprises at least one of a metal body with fins, a radiator, a cooling fan, a liquid-cooled heat sink, a heat pipe and a thermoelectric cooler.

6. The driver assistance system as claimed in claim 1, further comprising a processor operatively connected to said one or more optical sensors for deriving information to be conveyed to the car driver and/or for determining actions to be taken by the driver assistance system.

7. The driver assistance system as claimed in claim 1, wherein said optical detector is part of a computer vision system.

8. The driver assistance system as claimed in claim 1, wherein said light source is configured to emit pulsed light and/or intensity-modulated light.

9. The driver assistance system as claimed in claim 1, wherein said light source is an infrared light source.

10. The driver assistance system as claimed in claim 1, wherein said projection optics are made of plastic optical components.

11. The driver assistance system as claimed in claim 1, wherein said at least one of a stereoscopic imager, a time-of-flight imager, a structured-light imager and a night vision system comprises a plurality of light sources, each of said plurality of light sources being optically connected to said projection optics with one or more optical fibers.

12. The driver assistance system as claimed in claim 11, wherein said one or more optical fibers are merged to a fiber bundle leading to said projection optics.

13. The driver assistance system as claimed in claim 12, wherein said one or more optical fibers are merged to a fiber bundle in such a way that the optical fibers from the plurality of light sources are randomly arranged over the cross section of said fiber bundle.

14. Driver assistance system as claimed in claim 12, wherein said one or more optical fibers are merged to a fiber bundle in such a way that the one or more optical fibers from the plurality of light sources are arranged over the cross section of said fiber bundle in accordance with a particular pattern, in such a way that different illumination patterns can be produced in said scene by switching on different ones of said light sources or different combinations thereof.

15. An automotive vehicle, comprising a driver assistance system as claimed in claim 1, wherein said light source is arranged remote from said projection optics.

16. The automotive vehicle as claimed in claim 15, wherein said projection optics are arranged at a windscreen border and or in the front, e.g. at or in the headlamps or in the radiator cowling region, of said vehicle.

* * * * *